(12) United States Patent
Santicchi

(10) Patent No.: US 10,512,342 B2
(45) Date of Patent: Dec. 24, 2019

(54) APPARATUS FOR MOVING ARTICLES

(71) Applicant: IMMOBILIARE METALPROGETTI S.R.L., Perugia (IT)

(72) Inventor: Augusto Santicchi, San Sisto (IT)

(73) Assignee: IMMOBILIARE METALPROGETTI S.R.L., Perugia (IT)

( * ) Notice: Subject to any disclaimer, the term of this patent is extended or adjusted under 35 U.S.C. 154(b) by 0 days.

(21) Appl. No.: 16/085,933

(22) PCT Filed: Mar. 17, 2017

(86) PCT No.: PCT/EP2017/056360
§ 371 (c)(1),
(2) Date: Sep. 17, 2018

(87) PCT Pub. No.: WO2017/158150
PCT Pub. Date: Sep. 21, 2017

(65) Prior Publication Data
US 2019/0099014 A1    Apr. 4, 2019

(30) Foreign Application Priority Data

Mar. 17, 2016 (IT) .................. 102016000028253

(51) Int. Cl.
*A47F 7/24* (2006.01)
*A47B 61/00* (2006.01)
*B65G 17/20* (2006.01)
*A47F 5/025* (2006.01)

(52) U.S. Cl.
CPC ............. *A47F 5/025* (2013.01); *A47B 61/00* (2013.01); *A47F 7/24* (2013.01); *B65G 17/20* (2013.01); *B65G 2201/0229* (2013.01)

(58) Field of Classification Search
CPC ....... B65G 17/20; A47B 61/00; A47B 61/003; A47F 3/08; A47F 7/24; A47G 25/06
USPC ..................... 198/678.1, 684, 835
See application file for complete search history.

(56) References Cited

U.S. PATENT DOCUMENTS

| 2,017,944 A | * | 10/1935 | Braley | ............... A47B 61/003 211/163 |
| 2,228,610 A | * | 1/1941 | Reid | ............. A47F 3/08 211/1.52 |
| 2,967,081 A | * | 1/1961 | Kleinpenning | ......... A47B 61/00 186/26 |
| 4,183,172 A | * | 1/1980 | Lewis | ............. A63H 3/50 40/415 |
| 4,212,384 A | | 7/1980 | Grube | |

(Continued)

FOREIGN PATENT DOCUMENTS

WO    2015008173 A1    1/2015

OTHER PUBLICATIONS

International Search Report from PCT/EP2017/056360 dated Jun. 13, 2017 (8 pages).

*Primary Examiner* — James R Bidwell
(74) *Attorney, Agent, or Firm* — Calfee Halter & Griswold LLP

(57) ABSTRACT

Apparatus for moving articles comprising a conveyor member, a shelf provided with a guide cavity defining at least partly a movement path and a drive unit associated with the conveyor member and configured to move the conveyor member along the movement path. The conveyor member is provided with a support zone, a drawing zone, and an intermediate zone.

10 Claims, 4 Drawing Sheets

(56) References Cited

U.S. PATENT DOCUMENTS

| | | | |
|---|---|---|---|
| 7,556,139 B2 * | 7/2009 | Tsuruya | B62D 65/18 104/168 |
| 2008/0053795 A1 * | 3/2008 | Santicchi | B65G 17/20 198/678.1 |
| 2014/0190793 A1 * | 7/2014 | Otto | B65G 17/20 198/678.1 |
| 2015/0096869 A1 * | 4/2015 | Santicchi | B65G 17/20 198/685 |
| 2015/0259153 A1 * | 9/2015 | Buchmann | B65G 17/20 198/583 |

\* cited by examiner

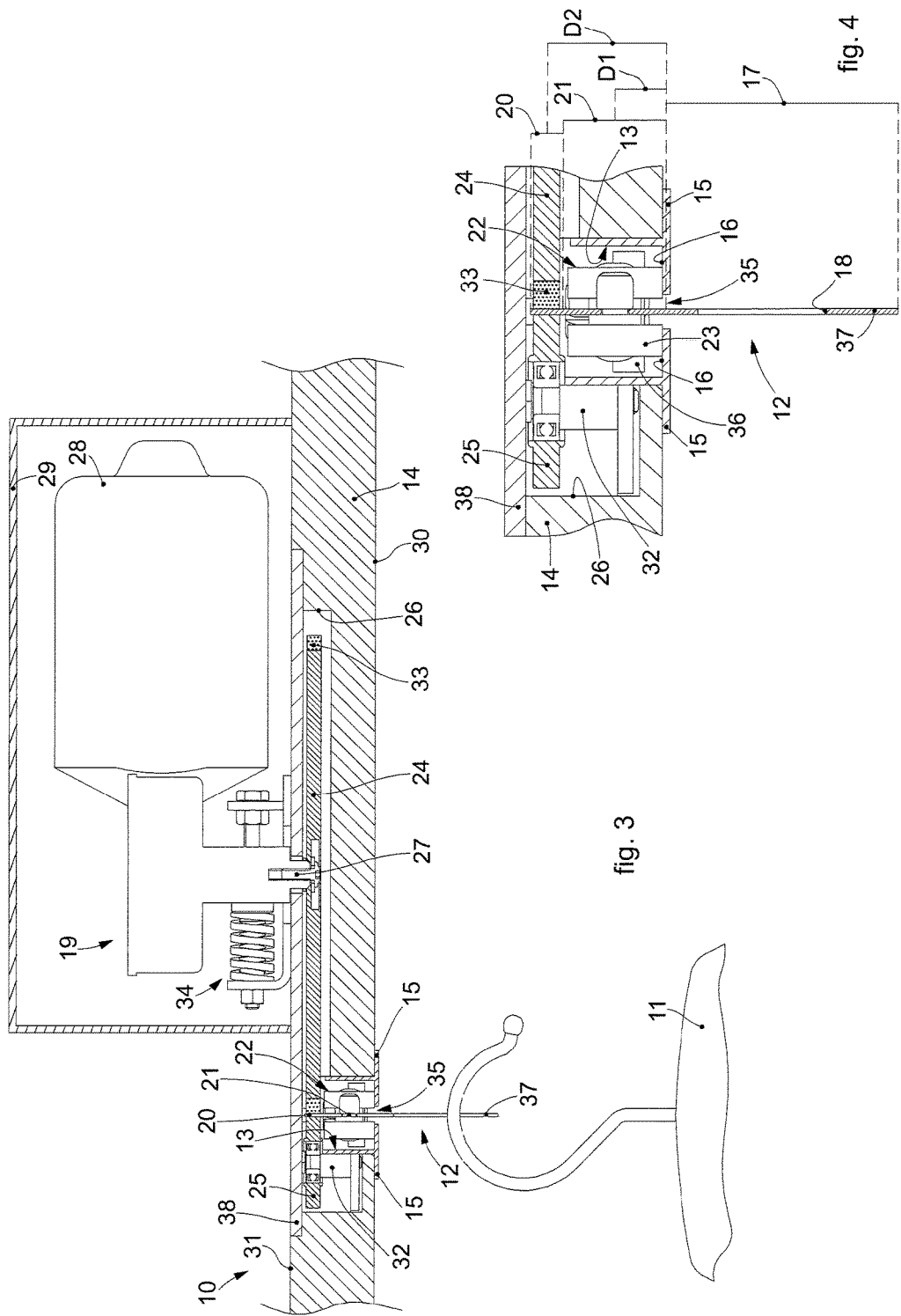

APPARATUS FOR MOVING ARTICLES

CROSS-REFERENCE TO RELATED APPLICATION

This application is the U.S. national phase entry of PCT/EP2017/056360, with an international filing date of 17 Mar. 2017, which claims the benefit of Italian Application Serial No. 102016000028253, with a filing date of 17 Mar. 2016, the entire disclosures of which are fully incorporated herein by reference.

FIELD OF THE INVENTION

The present invention concerns an apparatus for moving articles that can be installed for example in furnishing elements used as wardrobes.

In particular, the present invention can be used, merely by way of example, in the home, in hotels, or in commercial activities selling clothes, for the temporary or intennediate storage of articles or garments.

BACKGROUND OF THE INVENTION

Different types of movement apparatuses are known, used for temporarily storing and moving articles in order to make them selectively removable by an operator or other person from a desired position.

A movement apparatus is known, for example from document WO-A-2015/008173, integrated in a shelf possibly of a furnishing element, which comprises a conveyor member.

By way of non-restrictive example, by shelf we mean an element of a wardrobe or other furnishing element or it can be an element that can be inserted in a wall or the actual wall itself.

The conveyor member has a substantially closed-ring configuration and is provided with a plurality of through apertures, hooks or other configurations suitable to attach garments or other.

The shelf is provided with a guide cavity in which the conveyor member is at least partly positioned, and protrudes with a portion thereof through an aperture defined by the guide cavity.

The guide cavity defines a movement path for the conveyor member along which it is moved by a drive unit.

The drive unit, usually comprising a drive wheel acting on the conveyor member, cooperates with the guide cavity and, in the known solution described above, is installed in direct correspondence with the aperture of the guide cavity.

Although the aperture of the guide cavity, for example as described in WO-A-2015/008173, can have a rather limited width size, to define a protection for the drive unit, this aperture must be wide enough to facilitate the sliding of the conveyor member in the guide cavity.

The size of the aperture therefore does not prevent or exclude a user from accidentally inserting his/her fingers therein, even only partly, and thus being hurt quite seriously by the action of the drive wheel on the drive unit.

This solution is particularly dangerous since it disposes the moving parts of the drive unit in a position directly accessible for the operator, but also other persons, for example children who voluntarily or not can easily come into contact with the moving parts.

Another problem of this known solution is that, when an article has protruding and/or voluminous parts, these can come into contact with the drive unit, damaging the article and blocking the movement of the conveyor member.

A solution is also known, again for example from WO-A-2015/008173, in which the conveyor member is provided with a plurality of sliding elements, usually rollers, disposed in the guide cavity to facilitate the sliding of the conveyor member. The sliding elements are located in direct correspondence with the aperture of the guide cavity and the drive wheel is usually toothed, to interact with apertures made in the conveyor member and between the sliding elements. However, this configuration is subject to frequent blockages. Furthermore, this solution too provides that the drive unit is positioned in direct proximity to the aperture of the guide cavity, causing problems of potential danger for users, and problems of blockages.

There is therefore a need to perfect the state of the art and make available an apparatus for moving articles that overcomes at least one of the disadvantages of the state of the art.

The purpose of the present invention is to provide a movement apparatus that is safe.

Another purpose of the present invention is to obtain a movement apparatus that is efficient, that is, that can considerably reduce the risk of blockages.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the present invention concerns an apparatus for moving articles that comprises:

a conveyor member with a closed ring or linear oblong development with which at least an article to be moved is associated;

a drive unit associated with the conveyor member and configured to move the latter;

a shelf provided with a guide cavity, open toward a surface of the shelf in correspondence with an aperture and defining a movement path of the conveyor member.

In accordance with one aspect of the present invention, the conveyor member, cooperating with the guide cavity and with the sliding and support elements, is provided with:

a support zone disposed outside the guide cavity and suitable to support one or more articles;

a drawing zone located inside the guide cavity and cooperating with the drive unit;

an intermediate zone located inside the guide cavity, between the support zone and the drawing zone, and provided with sliding and support elements.

The drawing zone is located, with respect to the aperture, in a more internal position of the guide cavity with respect to the intermediate zone.

This allows to position the mobile parts of the drive unit, which cooperate with the conveyor member, in a protected position with respect to the aperture defined by the guide cavity, so as to increase the degree of safety of the movement apparatus.

In this way, it is possible to avoid any possibility of accidents, for example pinching or severing the fingers, should anyone put their fingers in the aperture of the guide cavity. Indeed, thanks to the interposition of the guide zone between the support zone and the drawing zone, it is possible to move the drawing zone of the conveyor member into a completely internal position, in the guide cavity, where the drive unit then acts and where there can be potential dangers.

The guide cavity, combined with the positioning of the drawing zone of the conveyor member, allows to generate a safety protection, without using dedicated protection bodies.

According to a variant, the drive unit comprises a drive wheel and a contrast element disposed on two opposite surfaces of the drawing zone and cooperating to draw the conveyor member above the intermediate zone.

According to the latter variant, the drive wheel and the contrast element are completely contained in a housing seating made in the shelf.

The drive wheel, contrasted by the contrast element, can be rubberized and operating by friction against the drawing zone of the conveyor member, so as to eliminate any noise of the moving mechanical parts.

According to a variant, the drive wheel is provided with a plurality of drawing teeth which cooperate with the drawing zone to move the conveyor member. This solution ensures the sure movement, that is, without sliding, of the conveyor member.

BRIEF DESCRIPTION OF THE DRAWINGS

These and other characteristics of the present invention will become apparent from the following description of some embodiments, given as a non-restrictive example with reference to the attached drawings wherein:

FIG. 3 is a section view of a part of a movement apparatus according to the present invention;

FIG. 4 is an enlarged view of a portion of FIG. 3;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
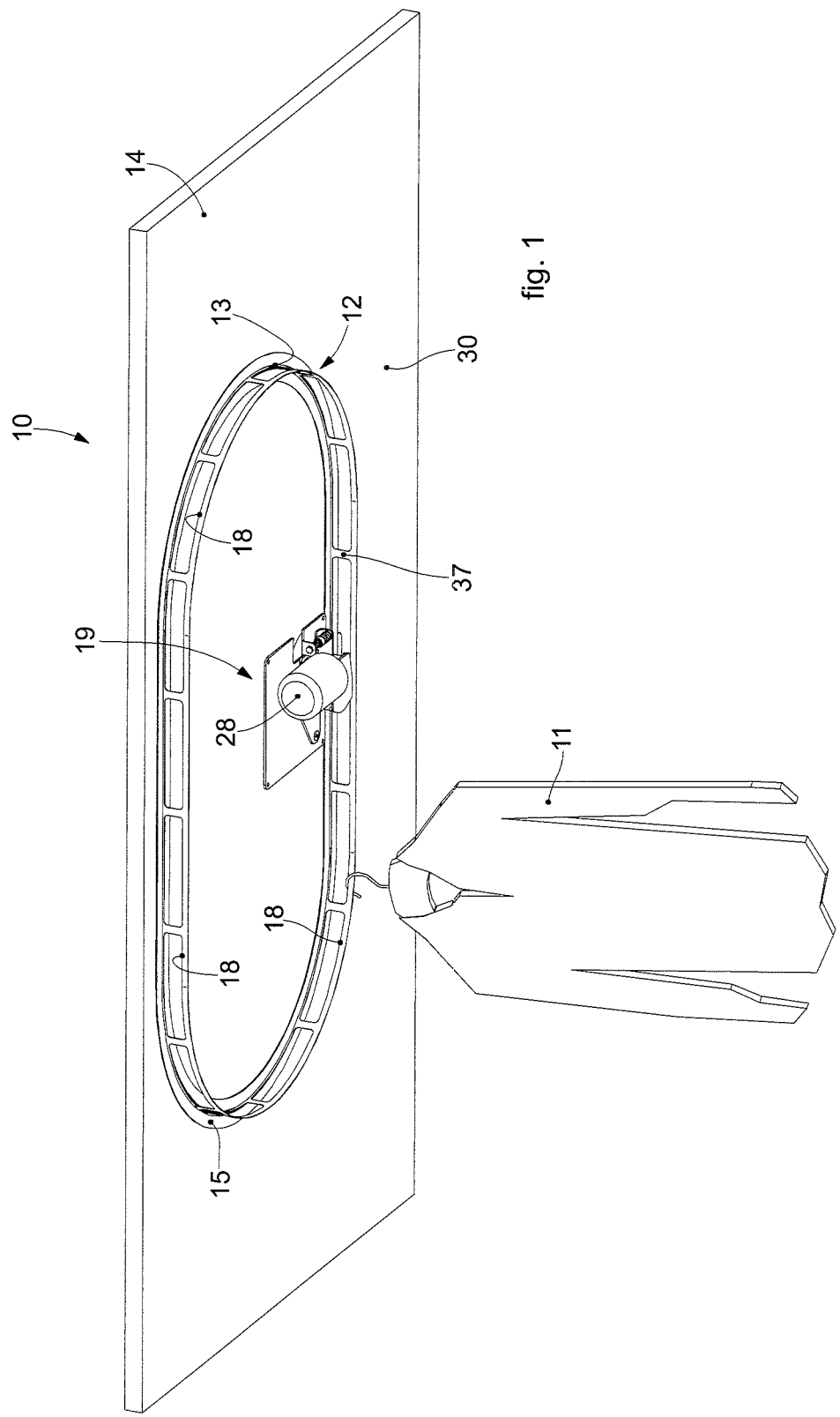
FIG. 1 shows a movement apparatus for articles according to the present invention.
Figure 2:
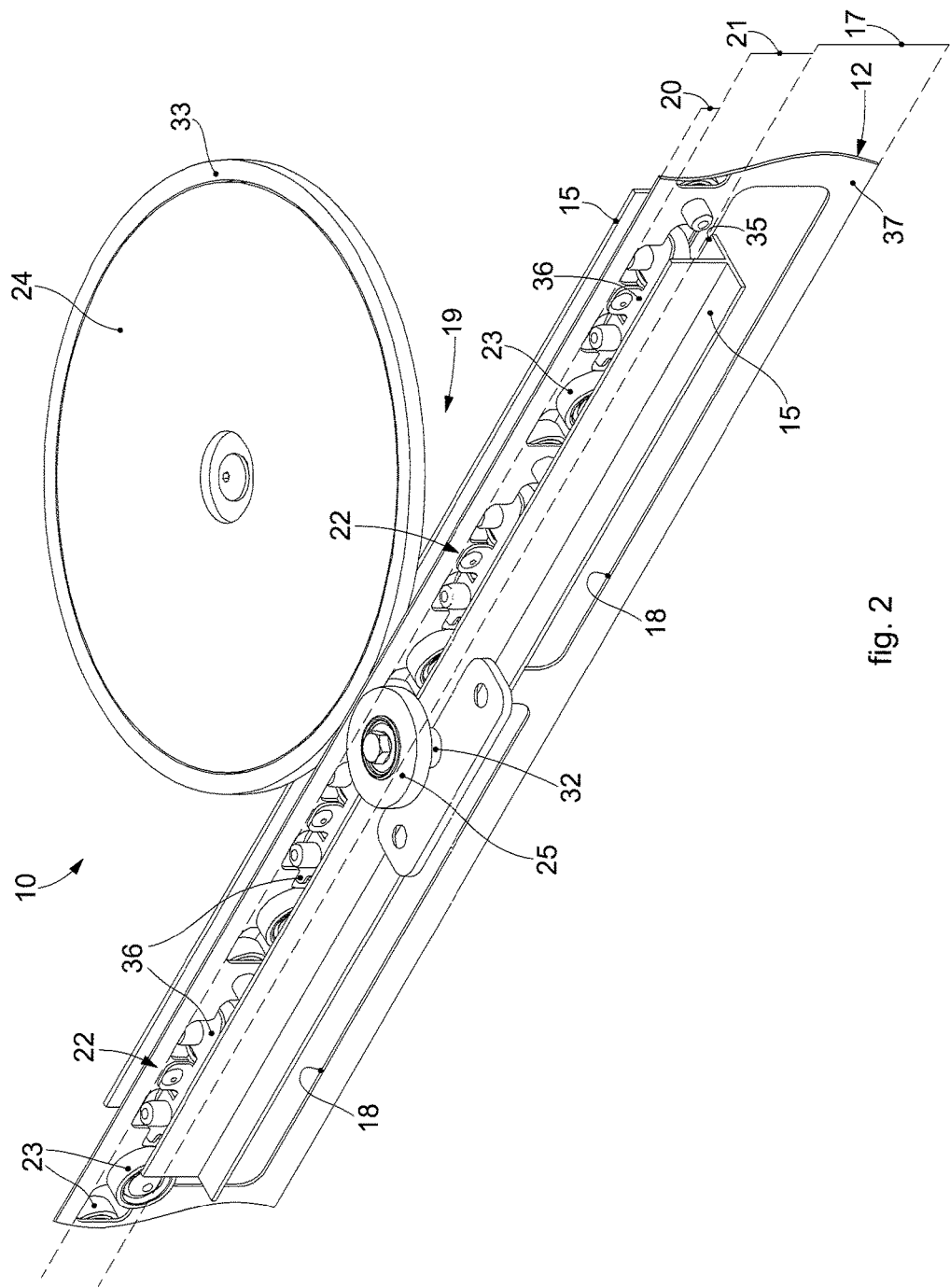
FIG. 2 is an enlarged detail of parts of a movement apparatus according to the present invention.

With reference to the attached drawings, which show non-restrictive examples of the invention, we will now describe some embodiments of an apparatus 10 for moving articles 11.

According to one aspect of the present invention, the movement apparatus 10 comprises a conveyor member 12 with an oblong development, closed-ring or linear depending on the specific conveying requirements, with which at least one article 11 can be associated.

The movement apparatus 10 also comprises a shelf 14 with which the conveyor member 12 is associated. The shelf 14 can itself define a plane that can be attached for example to a wall or ceiling, or it can be part of a furnishing element such as a wardrobe, walk-in closet or suchlike.

The movement path of the conveyor member 12 is defined by a guide cavity 13 provided in the shelf 14 which is coherent with the development of the conveyor member 12, that is, it can be a closed or open path and conformed on each occasion in a desired manner according to specific applications.

According to a preferential solution, the conveyor member 12 has a closed-ring configuration so that it is possible to move the conveyor member 12 substantially continuously to take the articles 11 associated with it on each occasion to a position accessible for the user.

According to a possible solution of the present invention, the guide cavity 13 has a cross section shape open toward one surface of the shelf 14, in correspondence with an aperture 35.

The aperture 35 has a slit configuration, and part of the conveyor member 12 protrudes through it, as described hereafter.

The guide cavity 13 can comprise guides 15, defined for example by shaped section bars, in this case T-shaped, disposed adjacent to each other and defining the slit type aperture 35 through which the conveyor member 12 partly protrudes.

The sizes of the aperture 35 are such as to prevent direct access to the moving parts contained in the guide cavity 13.

The guides 15 also define reference surfaces 16 of the movement path of the conveyor member 12.

According to a possible embodiment, the conveyor member 12 is defined by at least one plate-shaped element 37, such as a strip, or one or more foils, reciprocally connected to each other.

In particular, according to a possible solution, the conveyor member 12 can be defined by a belt with a laminar cross section, made of flexible material so as to adapt to the specific movement path, for example to adapt to specific curves that the movement path requires.

According to another solution, the conveyor member 12 comprises a plurality of oblong elements, for example plate-shaped, suitably connected with each other, for example with pivoting means (not shown). These plate-shaped elements or laminar elements too can be made of a flexible material to adapt to the specific movement path defined by the guide cavity 13.

According to one aspect of the invention, the conveyor member 12 is provided with a support zone 17 disposed outside the guide cavity 13, that is, protruding from the aperture 35, and suitable to support one or more articles 11.

In one embodiment, the support zone 17 is provided with a plurality of attachment elements 18 to which various articles, such as garments, can be removably hooked or attached.

The attachment elements 18 can comprise through apertures or holes, with which the articles 11 can be attached, for example by clothes-hangers.

According to a variant, the attachment elements 18 comprise hooks, vise grips or other similar attachment elements able to attach the articles 11 directly or indirectly.

According to one aspect of the invention, the movement apparatus 10 comprises a drive unit 19 associated with the conveyor member 12 in order to move it along the guide cavity 13.

According to one aspect of the invention, the conveyor member 12 comprises a drawing zone 20 disposed in the guide cavity 13 and cooperating with the drive unit 19 to draw the conveyor member 12 along the movement path.

According to the present invention, the conveyor member 12 comprises an intennediate zone 21 located between the support zone 17 and the drawing zone 20, and provided with sliding and support elements 22 cooperating with the guide cavity 13 to facilitate the sliding of the conveyor member 12 and to support the conveyor member 12 itself in the guide cavity 13.

The intermediate zone 21 is also located inside the guide cavity 13 and this allows to position the drawing zone 20 in an even more internal position with respect to the aperture 35.

In other words, it is provided that the intermediate zone 21 is positioned at a first distance D1 with respect to the aperture 35, while the drawing zone 20 is positioned at a second distance D2 with respect to the aperture 35, and the first distance D1 is greater than the second distance D2.

In particular, it is provided that the support zone 17, the drawing zone 20 and the intermediate zone 21 are distinct from each other.

According to a possible solution, the support zone 17, intermediate zone 21 and drawing zone 20 are provided on the at least one plate-shaped element 37.

In particular, it can be provided that the support zone 17, intermediate zone 21 and drawing zone 20 are located in continuation one with respect to the other in the order indicated, along the width of the cross section of the plate-shaped element 37.

According to one embodiment, the sliding and support elements 22 can include a plurality of rollers 23 connected to the intermediate zone 21 and rotatable around their axes of rotation which can be both parallel to the plane development of the shelf 14, and also orthogonal thereto.

The rollers 23 cooperate with the reference surfaces 16 defined by the guides 15 or with the surface of the guide cavity 13.

According to one embodiment, the rollers 23 can be connected to the intermediate zone 21 distanced from each other and possibly attached to support bodies 36 inserted in seatings made in the intermediate zone 21.

According to one embodiment, the drive unit 19 comprises a drive wheel 24 and a contrast element 25, disposed on two opposite surfaces of the drawing zone 20, above the intermediate zone 21, and cooperating to draw the conveyor member 12.

The contrast element 25 can be chosen from a group comprising at least one of either a wheel, a belt, a slider, which provides a contrast to the pressure action exerted by the drive wheel 24 on the conveyor member 12.

According to one embodiment (FIG. 3), the contrast element 25 and the drive wheel 24 are contained in a housing seating 26 made in the thickness of the shelf 14 and are positioned in the part most distant from the aperture 35 of the guide cavity 13.

The housing seating 26 can be closed to the outside by a covering element 38 which closes the contrast element 25 and the drive wheel 24 inside the housing seating 26. This prevents moving parts from being still accessible to users.

According to one embodiment of the present invention, thanks to the particular positioning of the drive unit 19 in the guide cavity 13, the shelf 14 can have a rather reduced thickness compared with known solutions, for example comprised between 20 mm and 40 mm and such as to contain at least part of the conveyor member 12 and the drive unit 19. This is particularly advantageous since it allows to increase the space usable for the articles 11 that are associated with the movement apparatus 10.

According to one embodiment, the drive unit 19 comprises a drive shaft 27 connected to a drive member 28 and on which the drive wheel 24 is attached, to be made to rotate.

The drive shaft 27 can be positioned through through a through hole made in the covering element 38.

According to one aspect of the invention, the drive unit 19 is configured to have its mobile parts, cooperating with the conveyor member 12, in the most distant part from the aperture 35 of the guide cavity 13, and positioned inside the guide cavity 13 and the housing seating 26. This increases the safety level of the movement apparatus 10.

Furthermore, this configuration allows to keep the sliding and support elements 22 separated from the drive wheel 24 and from the contrast element 25, so as not to cause blockages during functioning. In fact, the drive wheel 24 does not interfere or interact in any way with the sliding and support elements 22.

According to one embodiment, the drive member 28 can be contained in a protective element 29, removably attachable to the shelf 14 or to other elements attached to it.

According to one embodiment, depending on operating requirements and on the spaces available, the drive member 28 can be disposed on a first surface 30 of the shelf 14 from which the support zone 17 of the conveyor member 12 protrudes, that is, in which the guide cavity 13 is made. According to another embodiment, the drive member 28 is disposed on a second surface 31 of the shelf 14, opposite the first surface 30.

The possibility of personalizing the position of the drive member 28 and possibly the protective element 29 makes the movement apparatus 10 personalizable according to specific application requirements.

According to one solution, not shown, the protective element 29 can be configured and conformed so as to be able to function also as a support for the shelf 14. Merely by way of example, it can be provided that the protective element 29 extends protruding transversely with respect to the plane development of the shelf 14, and is disposed resting on a support plane, for example a base of a furnishing element or the floor. It is quite evident that this supporting function of the shelf 14 can also be performed by a dedicated support element, such as for example a panel, a column or other.

This allows to prevent any bending of the shelf 14 due to the weight of the articles supported by the movement apparatus 10 and therefore allows to increase the resistance of the shelf 14 and the bearing capacity of the movement apparatus 10.

According to one embodiment, the contrast element 25 is attached to the shelf 14 with a support bracket 32 attached in the housing seating 26 and provided to support the contrast element 25, keeping it on the same plane as the drive wheel 24.

According to one embodiment of the present invention, the drive wheel 24 can be rubberized, that is, it can be provided with a layer of rubber 33 along its peripheral edge. According to this embodiment the drive wheel 24 can be positioned pressing against the drawing zone 20 of the conveyor member 12 or against the contrast element 25.

According to a possible solution, the drive unit 19 comprises a presser member 34 associated with at least one of either the drive wheel 24 or the contrast element 25, in the case shown here, the drive wheel 24.

The presser member 34 is configured to ensure pressure and certain contact between the contrast element 25, the conveyor member 12 and the drive wheel 24.

According to one embodiment, the presser member 34 comprises an elastic element that generates a thrust on the drive shaft 27 in the direction of the conveyor member 12.

According to this embodiment, as it rotates, the drive wheel 24 moves the drawing zone 20 through friction with the rubber layer 33.

Thanks to the rubber layer 33 it is possible to eliminate the noises of the moving mechanical parts so as to make the movement apparatus 10 silent during use.

The rubberized drive wheel 24 also allows to use the movement apparatus 10 if there is no electric current, because it is functioning through friction.

Figure 5:
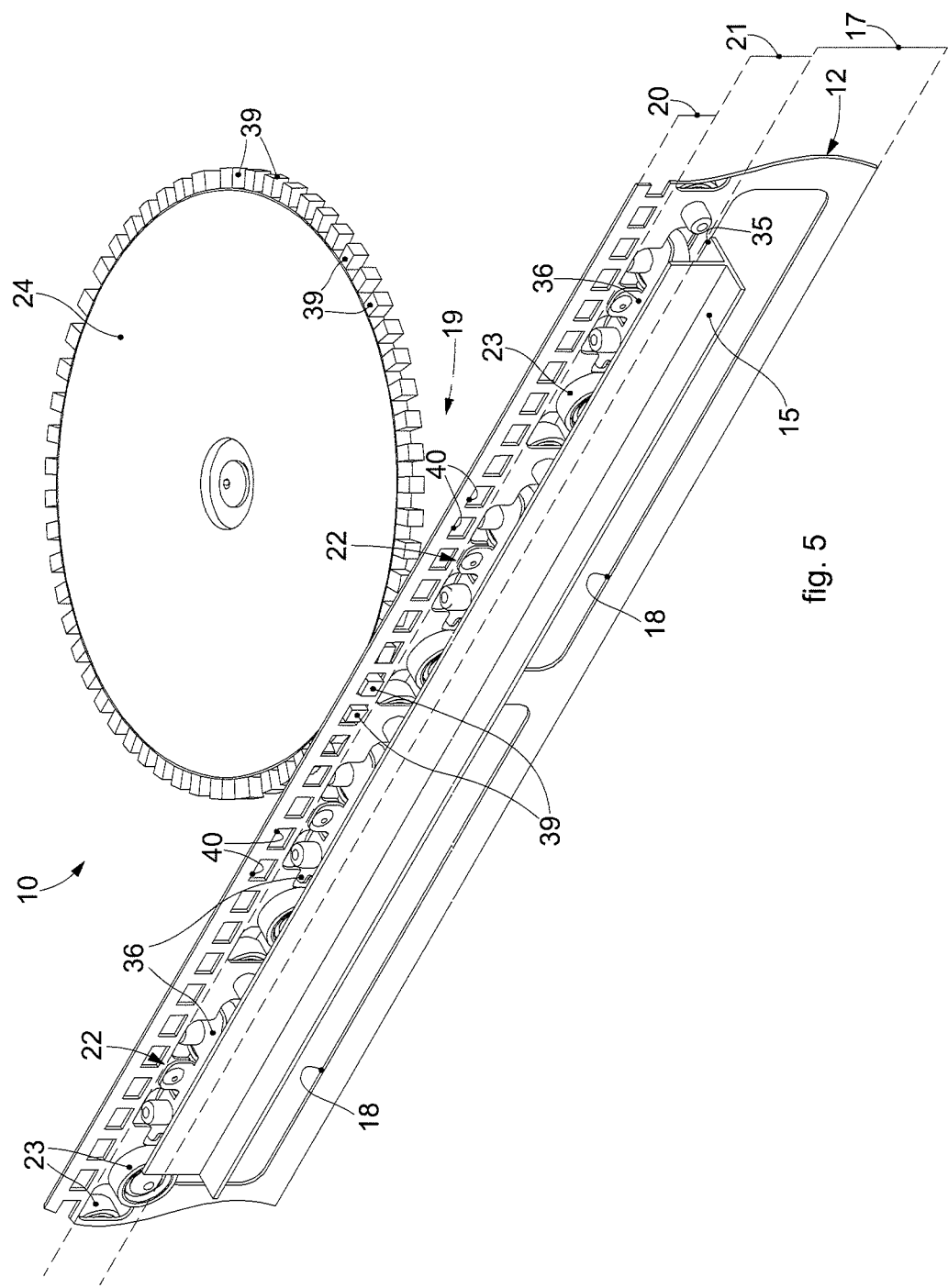
FIG. 5 shows a possible variant of FIG. 2.

According to a variant (FIG. 5), the drive wheel 24 is provided with a plurality of drawing teeth 39, which cooperate with suitable apertures 40 made in the drawing zone 20 to move, without sliding, the conveyor member 12.

In fact, the drawing teeth 39 are inserted during use into the apertures 40 of the conveyor member 12, thus defining the advance of the conveyor member 12 itself.

According to one embodiment, in the event of a lack of electric energy to drive the drive member 28, the movement apparatus 10 provides that the drive wheel 24 and/or the contrast element 25 is distanced, or are distanced with respect to each other, by a distance sufficient to move the conveyor member 12 manually and freely, without any interference between the drive wheel 24, the contrast element 25 and the conveyor member 12.

It is clear that modifications and/or additions of parts may be made to the movement apparatus 10 for articles as described heretofore, without departing from the field and scope of the present invention.

It is also clear that, although the present invention has been described with reference to some specific examples, a person of skill in the art shall certainly be able to achieve many other equivalent forms of movement apparatus 10 for articles, having the characteristics as set forth in the claims and hence all coming within the field of protection defined thereby.

The invention claimed is:

1. An apparatus for moving articles comprising a conveyor member, and a shelf provided with a guide cavity open toward a surface of said shelf in correspondence with an aperture, said guide cavity at least partly defining a movement path and wherein said apparatus comprises a drive unit associated with said conveyor member and configured to move said conveyor member along said movement path, wherein said conveyor member is provided with:
 - a support zone outside said guide cavity and suitable to support one or more of said articles;
 - a drawing zone located inside said guide cavity and cooperating with said drive unit;
 - an intermediate zone located inside said guide cavity, interposed between said support zone and said drawing zone, and cooperating with a plurality of sliding and support elements;

wherein said drawing zone is located, with respect to said aperture, in a more internal position of said guide cavity with respect to said intermediate zone, and wherein said conveyor member is defined by at least one plate-shaped element, and said support zone, said intermediate zone, and said drawing zone are provided on said at least one plate-shaped element, said support zone, said intermediate zone, and said drawing zone being located in continuation one with respect to the other along the width of the cross section of said plate-shaped element.

2. The apparatus as in claim 1, wherein said drive unit comprises a drive wheel and a contrast element disposed on two opposite surfaces of said drawing zone and cooperating to draw said conveyor member.

3. The apparatus as in claim 2, wherein said drive wheel and said contrast element are contained in a housing seating made in the thickness of said shelf.

4. The apparatus as in claim 2, wherein said drive unit comprises a drive member connected to a drive shaft on which said drive wheel is fixed in order to be made to rotate, said drive member is contained in a protective element removably attachable to said shelf.

5. The apparatus as in claim 4, wherein said protective element is connected to said shelf with the function of supporting the latter.

6. The apparatus as in claim 4, wherein said drive member is disposed on a first surface of said shelf in which said guide cavity is made.

7. The apparatus as in claim 4, wherein said drive member is disposed on a second surface of said shelf opposite said first surface in which said guide cavity is made.

8. The apparatus as in claim 2, wherein said drive wheel is provided with a rubber layer along its own peripheral edge and is positioned under pressure against said drawing zone.

9. The apparatus as in claim 2, wherein said drive wheel is positioned under pressure against said drawing zone by means of a pressure member, said pressure member being configured to ensure a pressure and a sure contact between said contrast element, said conveyor member and said drive wheel.

10. The apparatus as in claim 1, wherein said drive unit comprises a drive wheel provided with a plurality of drawing teeth configured to cooperate with apertures made in said drawing zone.

* * * * *